(12) United States Patent
Ali

(10) Patent No.: US 6,813,390 B2
(45) Date of Patent: Nov. 2, 2004

(54) SCALABLE EXPANDABLE SYSTEM AND METHOD FOR OPTIMIZING A RANDOM SYSTEM OF ALGORITHMS FOR IMAGE QUALITY

(75) Inventor: Walid S. I. Ali, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 617 days.

(21) Appl. No.: 09/912,468

(22) Filed: Jul. 25, 2001

(65) Prior Publication Data

US 2003/0026497 A1 Feb. 6, 2003

(51) Int. Cl.[7] .............................................. G06K 9/64
(52) U.S. Cl. ...................................... 382/278; 382/274
(58) Field of Search ................................ 382/154, 162, 382/254, 266, 274, 275, 278, 228; 348/92; 700/109; 358/518

(56) References Cited

U.S. PATENT DOCUMENTS

| | | | | |
|---|---|---|---|---|
| 5,189,511 A | * | 2/1993 | Parulski et al. | 358/518 |
| 5,255,345 A | * | 10/1993 | Shaefer | 706/13 |
| 5,835,627 A | | 11/1998 | Higgins et al. | 382/167 |
| 5,848,179 A | * | 12/1998 | Braet | 382/132 |
| 5,982,942 A | * | 11/1999 | Hosokawa | 382/266 |
| 6,549,815 B1 | * | 4/2003 | Kaji | 700/32 |
| 6,577,764 B2 | * | 6/2003 | Myler et al. | 382/228 |
| 6,628,842 B1 | * | 9/2003 | Nagao | 382/266 |

\* cited by examiner

*Primary Examiner*—Kanji Patel

(57) ABSTRACT

An optimizing video processing method and system selects algorithms for best obtainable video quality for the available computation resources. A video processing module, which processes an input of a video stream, architectural parameters for identifying an order of cascaded video functions and determining a bit precision between data of any consecutive cascaded functions according to an associated complexity level which correlates with a value of available computational resources. An optimizer module optimizes processing of the video stream and includes a plurality of optimization engines each having an associated complexity level. The optimizer module selects an optimization engine according a complexity level which correlates with the value of available computational resources. An Object Image Quality (OIQ) evaluator module evaluates an image quality of an output of the video stream from the video processing module. The OIQ evaluator module includes a plurality of objective image quality metrics having an associated complexity level. The OIQ evaluator module selects a metric according to a correlation factor and a complexity level for said value of available computation resources.

21 Claims, 4 Drawing Sheets

EVALUATING THE OBJECTIVE IMAGE QUALITY IN STEP (c) BY DETERMINING A CORRELATION FACTOR R ACCORDING TO THE FOLLOWING EQUATION:

$$F = \max_{R} \left\{ \sum_{i=1}^{n} w_i f_i \right\}$$

WHEREIN F IS A FINAL METRIC OF THE QUALITY OF THE VIDEO AS JUDGED BY THE SYSTEM, F BEING DETERMINED BY FINDING A SET OF WEIGHTS $w_i$, WHICH WHEN MULTIPLIED BY EACH INDIVIDUAL METRIC $f_i$ (WHICH RANGES FROM 1 TO n) OF THE PLURALITY OF METRICS MAXIMIZES THE CORRELATION FACTOR R WITH A PREDETERMINED SUBJECTIVE EVALUATION.

FIG. 5

SCALABLE EXPANDABLE SYSTEM AND METHOD FOR OPTIMIZING A RANDOM SYSTEM OF ALGORITHMS FOR IMAGE QUALITY

BACKGROUND OF THE INVENTION

1. Field of the Invention

The present invention relates to methods and systems for optimizing video quality. More particularly, the present invention relates to an expandable scheme of video algorithms used to improve image quality.

2. Description of the Related Art

In a video processing system, the video signal gets processed by a number of video functions (e.g. for sharpness enhancement, noise reduction, color correction, etc.) Each of these functions may need a (small or large) number of control parameters.

However, some of these parameters will have a substantial effect on the picture quality while others will have a lesser effect. Moreover, the order of applying the various functions could be a parameter (before building the hardware, which carries out the video processing functions as modeled by software, or if we have a highly flexible reconfigurable hardware), or the video system is static and cannot be altered.

In addition to the video processing functions themselves, there are two other modules, whose complexity level would determine the quality of the final video system.

An objective image quality (OIQ) evaluator unit may vary in complexity from a simple measure of simple signals (like the rise time of the luminance signal) to a fairly complicated system that simulates the psychophysics of the human vision system (HVS). The optimization process may vary in complexity from a greedy exhaustive search engine (which requires huge computational resource, almost impossible to have in most practical situations) to a smart heuristic search methodology with less computational requirements. Thus, there are a number of possible formulizations to model the problem of video processing optimization.

SUMMARY OF THE INVENTION

According to the present invention, a system for optimizing video quality includes a scalable optimization paradigm for providing the best attainable objective image quality for the available computational resources.

An optimizing video processing system comprises:

a video processing module for processing an input of a video stream, the video processing module comprising architectural parameters for identifying an order of cascaded video functions and determining a bit precision between any consecutive cascaded functions according to an associated complexity level which correlates with a value of available computational resources;

an optimizer module for optimizing processing of the video stream, the optimizer module being in communication with the video processing module, the optimizer module comprising a plurality of optimization engines each having an associated complexity level, the optimizer module includes means for selecting an optimization engine according to a complexity level which correlates with the value of available computational resources; and an Object Image Quality (OIQ) evaluator module for evaluating an image quality of an output of the video stream from the video processing module, the OIQ evaluator comprising a plurality of objective image quality metrics having an associated complexity level, and the OIQ evaluator module includes means for selecting a metric according to a correlation factor ri and a complexity level for the value of available computation resources.

The means for selecting the metric by the OIQ evaluator module may include determining a correlation factor R determined according to the following equation:

$$F = \max_{R} \left\{ \sum_{i=1}^{n} w_i f_i \right\},$$

wherein F is a final metric (of the quality of the video as judged by the system), F being determined by finding a set of weights $w_i$, which when multiplied by each individual metric $f_i$ (which ranges from 1 to n) of the plurality of objective metrics maximizes the correlation factor R with a predetermined subjective evaluation.

The system may also have a computational resource analyzer for selecting the associated complexity level of at least one of the video processing module, the optimizer module, and the OIQ evaluator module.

The optimizer module may include both deterministic and non-deterministic optimization engines.

The optimizer module may include heuristic search engines comprising at least one of genetic algorithms (GA), simulated annealing (SA), tabu search (TS), simulated evolution (SE), and stochastic evolution.

At least one of the video processing module, optimizer module and OIQ evaluator module can be scalable.

The computational resource analyzer module may select the level of complexity for at least one of the video processing module, the optimizer module, and the OIQ evaluator module by detecting available computational resources for one of the modules.

A method for optimizing video algorithms for available computation resources comprises:

(a) identifying an order of cascaded video functions by a video processing module for processing of a video stream input to the video processing module according to an associated level of complexity which correlates with a value of available computational resources;

(b) selecting an optimization method for optimizing the processing of the video stream, the optimization method being selected from a plurality of optimization methods according to an associated complexity level which correlates with the value of available computational resources;

(c) evaluating an objective image quality of the video stream after the video stream is output from the video processing module;

wherein the evaluating of the objective image quality of the video stream is determined by selecting a metric from a plurality of metrics according to a correlation factor and an associated complexity level for the value of computational resources.

The evaluating of the objective image quality in step (c) may include determining a correlation factor R determined according to the following equation:

$$F = \max_R \left\{ \sum_{i=1}^{n} w_i f_i \right\},$$

wherein F is a final metric (the quality of the video as judged by the system), F being determined by finding a set of weights $w_i$, which when multiplied by each individual metric $f_i$ (which ranges from 1 to n) of the plurality of metrics maximizes the correlation factor R with a predetermined subjective evaluation.

The method may further comprise:

(d) selecting the associated complexity level of at least one of step (a), (b) and (c) by a computational resource analyzer.

The plurality of optimization methods selected in step (b) may include both deterministic and non-deterministic optimization methods.

The plurality of optimization methods include heuristic search engines comprising at least one of genetic algorithms (GA), simulated annealing (SA), tabu search (TS), simulated evolution (SE), and stochastic evolution.

The associated complexity level selected in step (d) may include detecting computational resources available for at least one of steps (a), (b) and (c).

The video processing module recited in step (a) is scalable.

Step (b) may include providing a scalable optimizer for selecting the optimization method.

Step (c) may include providing a scalable objective image quality evaluator for evaluating the objective image quality.

The system may also comprise a video-processing module, an optimizer module, a scalable Objective Image Quality (OIQ) evaluator module, and a computational resource analyzer.

The video processing module comprises a plurality of video processing functions $F_1, F_2, \ldots F_n$. Each function has a set of parameter $P_i$, $1 \leq i \leq n$, which is sorted ascendingly in terms of their effect on the resulting image quality. The video processing module has its own set of architectural parameters, which describe the cascaded video processing functions' order as well as the bit precision of the data bus between any two consecutive functions.

The optimizer module is a scalable optimizer with a plurality of possible optimization mechanisms. The optimizer module may comprise a number of optimization search engines varying in complexity and the corresponding required resources. The search engines may be exhaustive or heuristic.

The scalable OIQ-evaluator module comprises a plurality of OIQ metrics having different levels of complexity. A table of complexity levels is kept by the OIQ-evaluator module which contains all the constituent metric methods and the presumed complexity for each metric.

The computational resource analyzer module is an arbitrator, which based on the available computational resources will decide on which level of complexity for all other modules should be invoked.

BRIEF DESCRIPTION OF THE DRAWINGS

FIG. 5 is a continuation of the flowchart shown in FIG. 4.

DETAILED DESCRIPTION OF THE INVENTION

Figure 1:
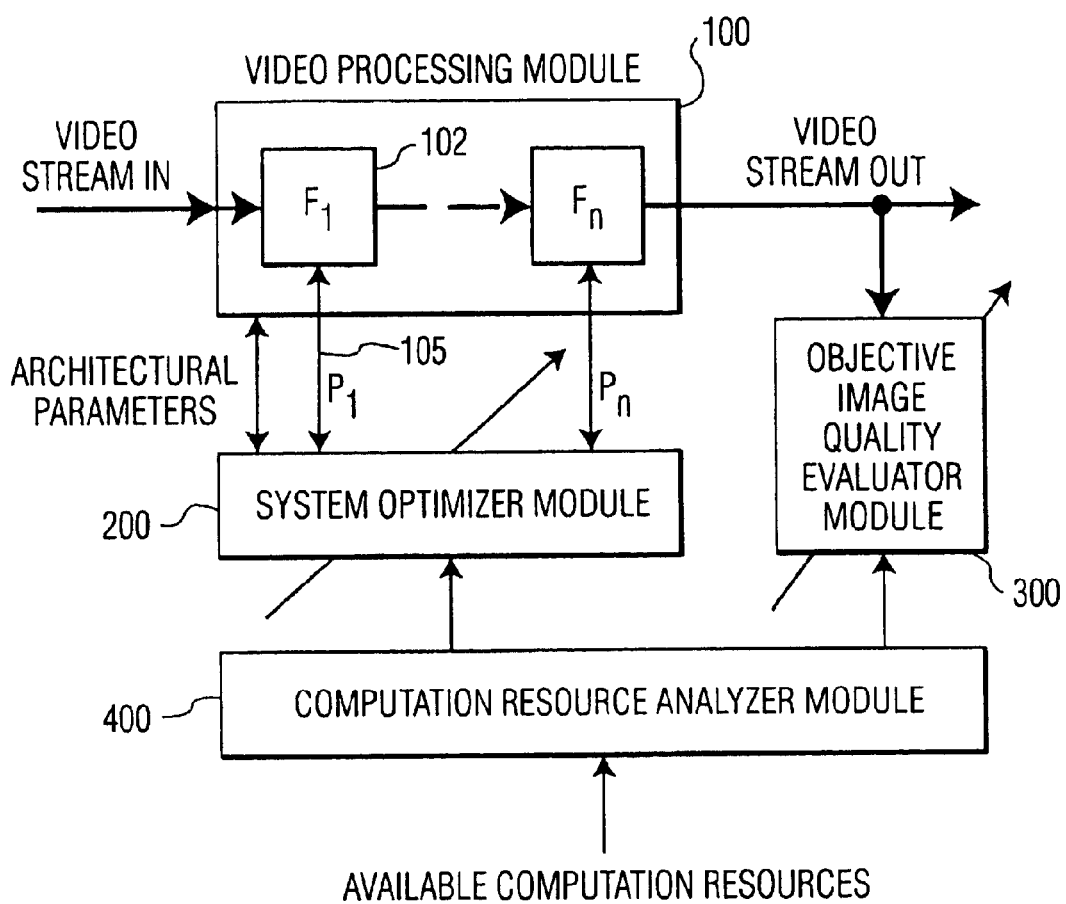
FIG. 1 is an overview of the scalable optimization system according to the present invention.

FIG. 1 illustrates an overview of a scalable optimizing system according to the present invention. According to FIG. 1, there is a video processing module 100, a system optimizer module 200, an objective image quality evaluator module 300 and an optional computational resource analyzer module 400.

The video processing module 100 comprises architectural parameters for identifying an order of cascaded video functions, and for determining a bit precision between data of any consecutive cascaded functions.

As shown in FIG. 1, there are a number of video processing functions 102 (ranging from by $F_1$ through $F_n$), each function having a set of architectural parameters Pi 105, ranging from $P_1$ to $P_n$. The set of parameters Pi (where $1 \leq i \leq n$) and which are sorted ascendingly in terms of their effect on resulting image quality.

Figure 2:
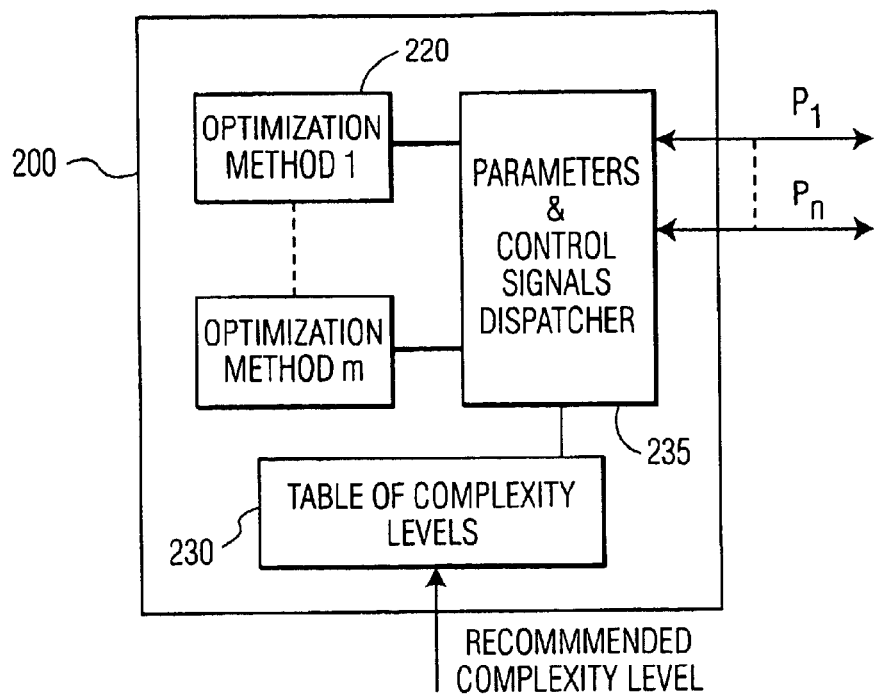
FIG. 2 is a detailed diagram of the optimizer module shown in FIG. 1.

FIG. 2 shows a detailed example of the optimizer module 110 shown in FIG. 1. This module comprises of a number of optimization engines (m search engines) which can be referred to as optimization methods 220, which vary in complexity, representation, and required computational resources. The optimization methods 220 may comprise a simple exhaustive search methodology (which will perturb all the pre-defined parameters over their range of values), as well as a number of heuristic search engines.

The optimizer module also keeps a record of each method's presumed complexity level in table 230. The optimizer module is expandable since any sought engine could be appended to it, as long as its relative complexity level with other complexity levels of other methods is defined. Based on the appropriate complexity level, which could be afforded by the available resource, the parameter and control signals dispatcher 235 in the optimizer module invokes the suitable optimization engine. The dispatcher contains control signals for invoking the suitable method (i.e. engine) and architectural parameters. In this embodiment, a recommended complexity level is selected and/or supplied by the computational resource analyzer 130 (shown in FIG. 1) but the computational resource analyzer is an optional feature. The recommended complexity level may be selected by the optimizer module, for example.

By way of illustration and not by limitation, some of the methods in the optimizer module can be heuristic methods that may vary from a greedy method, wherein a good solution is constructed in stages, to more local heuristic search methods, e.g., genetic algorithms (GA's), simulated annealing (SA), tabu search (TS), simulated evolution (SE), stochastic evolution (SE) any hybrid of any number of these methods.

With regard to the optimizer module, examples of several heuristic search methods previously mentioned are now disclosed in more detail here. However, these methods are known by person of ordinary skill in the art.

Video processing algorithms, when used with heuristic methods may use, for example, genetic algorithms (GA). The GA method will evolve toward a system configuration permitting the best image quality.

GA's are iterative procedures that maintain a group of potential "candidate" solutions, which are evaluated and assigned a fitness value. GA's are known procedures to solve complex problems, and the section entitled book "Genetic Algorithms in Optimization and Adaptation" of a book entitled Advances in Parallel Algorithms, by Kronsjo and Shumshesuddin, pages 227–276 (1990) are hereby incorporated by reference as background material.

GA's are iterative procedures that maintain a population of candidate solutions encoded in the form of chromosome strings. Each chromosome defines a certain way in which different video processing modules are connected, and thus, the way the sequences are processed. In turn, each chromosome comprises a number of genes, which in the case of video optimization process are the video processing functions as well ass their order.

Simulated annealing is a methodology, not a fixed algorithm, in which a global minimum is calculated for a solution in regard to the complexity level that will be used by the optimizer module.

TABU search is an adaptive procedure used for solving combinatorial optimization problems, which may direct a heuristic to continue exploration of a descending hill without falling back into a previous optimum from which it previously emerged.

Simulated Evolution is a method by which a series of equations are used for determining the fitness for a complexity level over a series of generations.

Stochastic evolution is a method of using genetic random variables dependent usually on a parameter which denotes time in genetic programming.

Figure 3A:
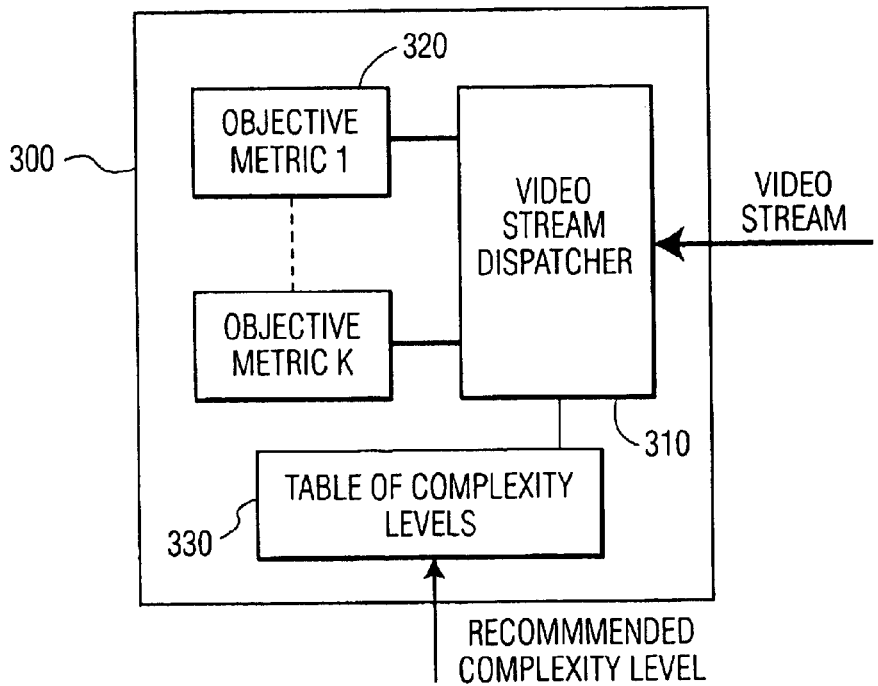
FIG. 3A is a detailed diagram of the objective image quality evaluator shown in FIG. 1.

FIG. 3A is a detailed illustration of the OIQ evaluator module. The OIQ evaluator module 300 consists of a number of objective image quality metrics (K metrics 320) that vary in complexity. The OIQ module keeps a record of its constituent metrics methods as well as each method's presumed complexity level in table 330. The OIQ module is extendable, since any proposed metric could be appended to it, as long as its relative complexity level is priory defined. Based on the appropriate complexity level, which could be afforded by the available resources, the video stream dispatcher 310 in the OIQ module invokes the suitable OIQ metric.

With regard to metrics, each objective metric 320 has a rating according to the desired level of performance and the allowable complexity, referred to as a figure of merit. In other words, the figure of merit represents the quality of the video signal based on that individual metric. A correlation factor with the human perception of video quality permits a scalable model, and new objective metrics can be added to or removed from the system so long as its correlation with human perception is defined.

Figure 3B:
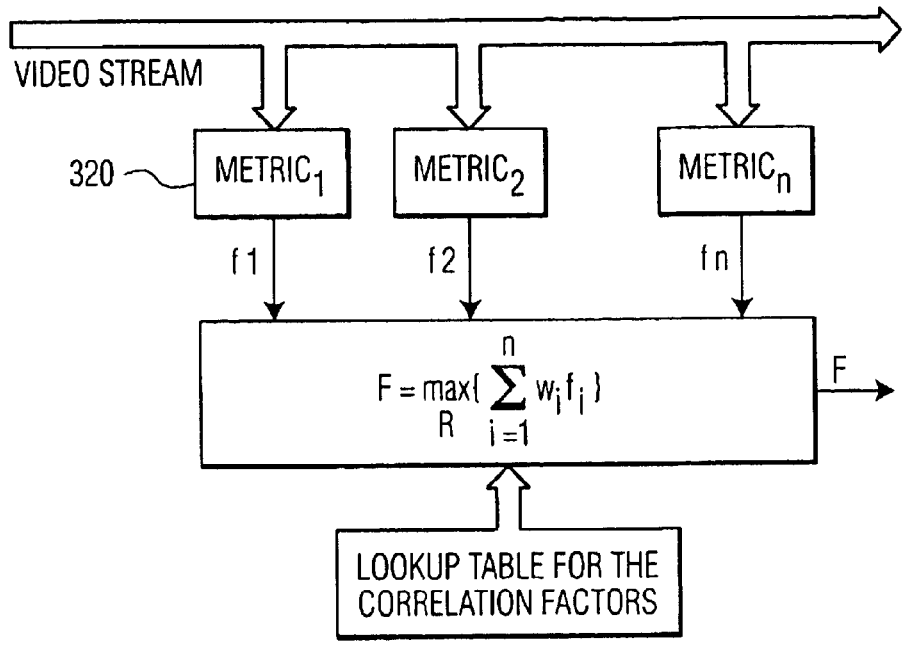
FIG. 3B is an illustration of the flow of a scalable dynamic objective metric.

FIG. 3B is an illustration of a scalable objective metrics 320 shown in FIG. 3A with more detail of the table of complexity levels 330. Each of the metrics has a correlation factor (R, $1 \leq i \leq n$) with the "1" from first metric $f_1$ and the "n" from the last metric $f_n$. Based on each single correlation factor, the evaluator gives a weight $w_i$ for each figure of merit, while trying to maximize the overall correlation factor R of the final composite metric F with the predetermined subjective result, according to the equation:

$$F = \max_R \left\{ \sum_{i=1}^{n} w_i f_i \right\}$$

For fast systems (real-time) complicated measurement metrics can be switched off and the decision making is made in the absence of their figures of merit. For simulation and video chain optimization purposes, where more time can be afforded, more complicated metrics are switched on and their results contribute to the final objective measure.

The computational resource analyzer module 400, which is optional, may provide for the detection of the available computational resources, and decide on the appropriate analyzer complexity level as well as the suitable complexity level for the OIQ module.

Thus, just as certain complicated metrics can be switched off because of real time consideration, a value of the computing resources availability can be provided to the OIQ evaluator module to remove certain metrics from selection because the resources would exceed the available capacity. This value could also be received by the system optimizer module 200 whereby the optimization method 220 selected would have to fit within the given available resources.

The end result is that the algorithms chosen are optimized according to the available resources available to achieve the best objective image quality. This objective image quality, in turn, correlates to the subject image quality of the human vision system. Depending on the availability of resources at any given point in time, different algorithms and/or different metrics might be selected for a given image. This flexible approach maximizes image quality because with a static system, there would need to be a conservative threshold in terms of selecting an algorithm or metric so as not to overrun the availability of resources. If the resources are overrun by the requirement of the algorithm or metric, there could be a system interruption, and at the very least, a perceivable lapse by human vision while a substitute algorithm is chosen to fit within a resource capacity at a given moment in time.

Figure 4:
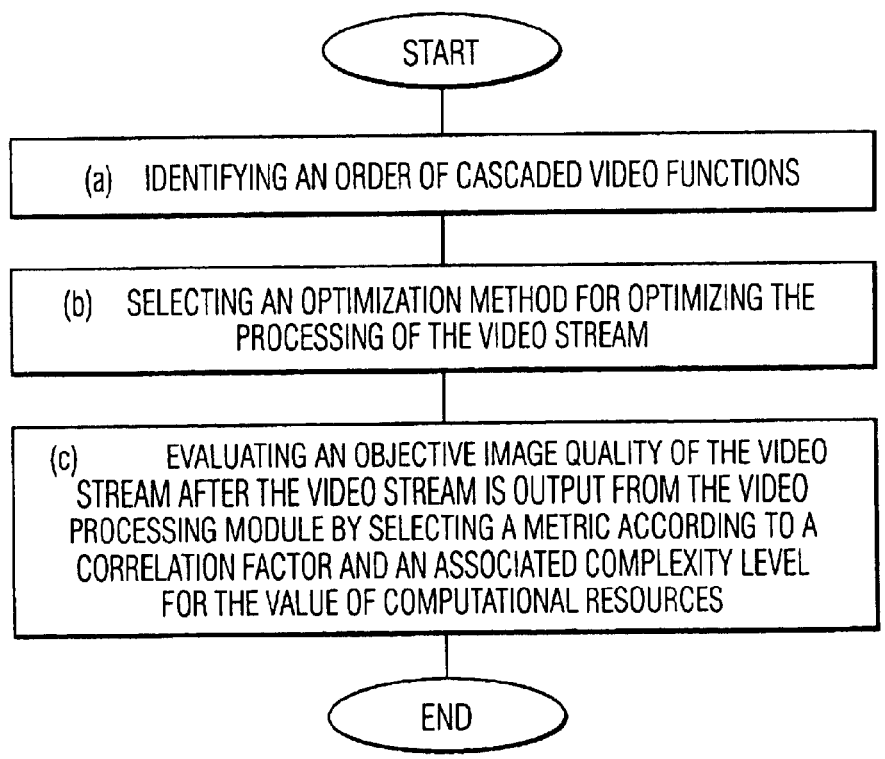
FIG. 4 is a flowchart of a method of the present invention.

FIGS. 4 and 5 are flowcharts illustrating a basic overview of the method according to the present invention.

As recited in step (a), there is an identifying of an order of cascaded video functions.

Step (b) recites that there is a selecting of an optimization method for optimizing the processing of the video stream.

Step (c) recites that there is an evaluating of an objective image quality of the video stream after the video stream is output from the video processing module by selecting a metric according to a correlation factor and an associated complexity level for the value of computational resources.

FIG. 5 recites the evaluating of the objective image quality in step (c) by determining a correlation according to the previously recited equation.

As previously disclosed, the computational resource module could be bypassed, if there is a desire to dictate a certain level of complexity on either/both of the optimizer module and/or the OIQ module.

Various modifications to the above system and method may be made by persons of ordinary skill in the art which do not deviate from the spirit of the invention and the scope of the appended claims.

What is claimed is:

1. An optimizing video processing system comprising:
   a video processing module for processing an input of a video stream, said video processing module comprising architectural parameters for identifying an order of cascaded video functions and determining a bit precision between data of any consecutive cascaded functions according to an associated complexity level which correlates with a value of available computational resources;
   an optimizer module for optimizing processing of said video stream, said optimizer module being in communication with said video processing module, said optimizer module comprising a plurality of optimization engines each having an associated complexity level, said optimizer module includes means for selecting an optimization engine according to a complexity level which correlates with said value of available computational resources; and an Object Image Quality (OIQ) evaluator module for evaluating an image quality of an output of said video stream from said video processing module, said OIQ evaluator comprising a plurality of objective image quality metrics having an associated complexity level, and said OIQ evaluator module includes means for selecting a metric from said plurality of objective metrics according to a correlation factor R and a complexity level for said value of available computation resources.

2. The system according to claim 1, wherein said means for selecting the metric by said OIQ evaluator module includes determining said correlation factor R determined according to the following equation:

$$F = \max_R \left\{ \sum_{i=1}^{n} w_i f_i \right\},$$

wherein F is a final metric of the quality of the video as judged by the system, F being determined by finding a set of weights $w_i$, which when multiplied by each individual metric $f_i$ of said plurality of objective metrics (which ranges from 1 to n) maximizes the correlation factor R with a predetermined subjective evaluation.

3. The optimizing video processing system according to claim 1, further comprising:
a computational resource analyzer for selecting the associated complexity level of at least one of said video processing module, said optimizer module, and said OIQ evaluator module.

4. The system according to claim 1, wherein said optimizer module includes both deterministic and non-deterministic optimization engines.

5. The system according to claim 4, wherein said optimizer module includes heuristic search engines comprising at least one of genetic algorithms (GA), simulated annealing (SA), tabu search (TS), simulated evolution (SE), and stochastic evolution.

6. The system according to claim 2 wherein said optimizer module includes heuristic search engines comprising at least one of genetic algorithms (GA), simulated annealing (SA), tabu search (TS), simulated evolution (SE) and stochastic evolution.

7. The video processing system according to claim 1, wherein said optimizer module is scalable.

8. The video processing system according to claim 2, wherein said optimizer module is scalable.

9. The video processing system according to claim 1, wherein said OIQ evaluator module is scalable.

10. The video processing system according to claim 2, wherein said OIQ evaluator module is scalable.

11. The video processing system according to claim 7, wherein said OIQ evaluator module is scalable.

12. The video processing system according to claim 2, wherein said computational resource analyzer module selects the level of complexity for the at least one of said video processing module, said optimizer module, and said OIQ evaluator module by detecting available computational resources for the at least one of said video processing module, said optimizer module and said OIQ evaluator module.

13. A method for optimizing video algorithms for available computation resources, said method comprising:
(a) identifying an order of cascaded video functions by a video processing module for processing of a video stream input to said video processing module according to an associated level of complexity which correlates with a value of available computational resources;
(b) selecting an optimization method for optimizing the processing of the video stream, said optimization method being selected from a plurality of optimization methods according to an associated complexity level which correlates with said value of available computational resources;
(c) evaluating an objective image quality of the video stream after the video stream is output from said video processing module;
wherein the evaluating of said objective image quality of the video stream is determined by selecting a metric from a plurality of metrics according to a correlation factor R and an associated complexity level for said value of computational resources.

14. The method according to claim 13, wherein the evaluating of said objective image quality in step (c) includes
determining said correlation factor R according to the following equation:

$$F = \max_R \left\{ \sum_{i=1}^{n} w_i f_i \right\},$$

wherein F is a final metric of the quality of the video as judged by the system, F being determined by finding a set of weights $w_i$, which when multiplied by each individual metric $f_i$ of said plurality of metrics (which ranges from 1 to n) maximizes the correlation factor R with a predetermined subjective evaluation.

15. The method according to claim 14, further comprising
(d) selecting the associated complexity level of at least one of step (a), (b) and (c) by a computational resource analyzer.

16. The method according to claim 13, wherein the plurality of optimization methods selected in step (b) includes both deterministic and non-deterministic optimization methods.

17. The method according to claim 16, wherein the plurality of optimization methods include heuristic search engines comprising at least one of genetic algorithms (GA), simulated annealing (SA), tabu search (TS), simulated evolution (SE), and stochastic evolution.

18. The method according to claim 15, wherein said the associated complexity level selected in step (d) includes detecting computational resources available for at least one of steps (a), (b) and (c).

19. The method according to claim 13, wherein the video processing module recited in step (a) is scalable.

20. The method according to claim 13, wherein step (b) includes providing a scalable optimizer for selecting the optimization method.

21. The method according to claim 13, wherein step (c) includes providing a scalable objective image quality evaluator for evaluating the objective image quality.

* * * * *